United States Patent
Sadan et al.

(10) Patent No.: US 9,733,632 B2
(45) Date of Patent: Aug. 15, 2017

(54) METHOD AND SYSTEM FOR DISTRIBUTED GENERATION TRIP PROTECTION USING POWER LINE CARRIER SIGNALING

(71) Applicant: GridEdge Networks, Inc., Littleton, MA (US)

(72) Inventors: Nachum Sadan, Carlisle, MA (US); Norm Strandberg, Westford, MA (US); Bruce Renz, Columbus, OH (US)

(73) Assignee: GridEdge Networks, Inc., Littleton, MA (US)

( * ) Notice: Subject to any disclaimer, the term of this patent is extended or adjusted under 35 U.S.C. 154(b) by 571 days.

(21) Appl. No.: 14/332,495

(22) Filed: Jul. 16, 2014

(65) Prior Publication Data

US 2015/0081126 A1    Mar. 19, 2015

Related U.S. Application Data

(60) Provisional application No. 61/846,815, filed on Jul. 16, 2013.

(51) Int. Cl.
| | |
|---|---|
| *H02H 3/00* | (2006.01) |
| *G05B 15/02* | (2006.01) |
| *H04B 3/54* | (2006.01) |
| *H02J 13/00* | (2006.01) |

(52) U.S. Cl.
CPC ............ *G05B 15/02* (2013.01); *H04B 3/546* (2013.01); *H02J 13/0027* (2013.01); *H04B 2203/5483* (2013.01); *Y02E 60/723* (2013.01); *Y02E 60/7892* (2013.01); *Y04S 10/16* (2013.01); *Y04S 40/146* (2013.01)

(58) Field of Classification Search
CPC ....................................................... G05B 15/02
USPC ............................................................ 361/71
See application file for complete search history.

(56) References Cited

U.S. PATENT DOCUMENTS

| | | | |
|---|---|---|---|
| 6,429,546 B1 * | 8/2002 | Ropp | H02J 3/01 307/31 |
| 7,304,403 B2 | 12/2007 | Xu | |
| 7,372,808 B2 * | 5/2008 | Spiess | H02H 3/05 361/62 |
| 8,346,402 B2 | 1/2013 | Guzman-Casillas et al. | |
| 8,896,393 B2 * | 11/2014 | Fiorelli | H04B 3/56 333/124 |

* cited by examiner

*Primary Examiner* — Stephen W Jackson
(74) *Attorney, Agent, or Firm* — Ware, Fressola, Maguire & Barber LLP (57) ABSTRACT

A method and system for sending a repetitive permissive guard signal from an electrical power substation to a distributed generation site over existing medium voltage distribution lines to detect an islanding condition and apply transfer trip protection is disclosed. The permissive guard signal causes a receiver at the distributed generation site to control a recloser at the distributed generation site. Loss of the signal at the receiver device causes the tripping of the recloser at the distributed generation site in less than two seconds. The tripping of the recloser physically disconnects the distributed generation site from the electric power grid. The coupling to the medium voltage distribution lines can be implemented via a single phase-to-ground coupling or via a phase-to-phase differential coupling for multi-phase medium voltage distribution lines.

23 Claims, 9 Drawing Sheets

METHOD AND SYSTEM FOR DISTRIBUTED GENERATION TRIP PROTECTION USING POWER LINE CARRIER SIGNALING

CROSS-REFERENCE TO RELATED APPLICATION

This application claims priority under 35 USC §119 to U.S. Provisional Patent Application No. 61/846,815 filed on Jul. 16, 2013, whose entire contents are hereby incorporated by reference in their entirety.

TECHNICAL FIELD

The present invention generally relates to the detection of an islanding condition in a section of an electrical power grid and protection of utility scale distributed generation facilities that connect directly to that circuit on the grid, Using Power Line Carrier communications technology as a signaling mechanism between a utility substation and a distributed generation (DG) facility for delivery of a permissive protection signal.

BACKGROUND OF THE INVENTION

In recent years, electric utilities have been receiving applications from Independent Power Producers (IPP) seeking interconnection agreements to connect to their electric grid. In order for an IPP to connect to the electrical grid system, an isolation and protection scheme has to be implemented to prevent islanding from occurring. An islanding situation occurs when there is a break on a section of the grid between a substation and a distribution generation (DG) facility. When this happens, the connected DG may face a number of problems:

- Islanding creates a potential hazard for utility line-workers and the public by causing a line to be energized by the DG although the line is assumed to be disconnected from the main power grid.
- The distributed generator may become overloaded when it is forced to power the isolated line.
- The DG can be damaged when reconnected to the main power grid after being islanded since the DG is unlikely to be synchronized with other DG sites in the system at the instant of reconnection, and out-of-phase reclosing can inject massive current to the DG.
- While being in the islanding situation, the DG could produce incorrect voltage and frequency to other power users connected to the power line near the DG, which can damage equipment at the users.

The IEEE 1547 standard requires that DG sites go offline within 2 seconds from detection of an islanding condition. A Transfer Trip (TT) command must be signaled in order to cause the tripping (opening) of a recloser or circuit breaker at the DG site so that the DG site is physically disconnected from the electrical power grid. This requirement can be implemented in a number of different signaling methods. Traditionally, copper telephone lines, wireless radio and fiber-optics have been used for signaling. However, telephone lines installed in substations are costly because they require expensive ground potential rise equipment. Radio solutions using unlicensed 900 MHz spectrum do not reach far enough to be useful except in very rare situations where the substation is very close to the generator and no other reclosers are installed on the feeder. Fiber based solutions are also costly and require a longer installation process.

SUMMARY OF THE INVENTION

The present invention provides a method and system for detection of islanding and applying transfer trip protection in an electrical power grid using Power Line Carrier (PLC) signaling over existing Medium Voltage (MV) distribution lines.

The first aspect of the present invention is a method of sending a permissive guard signal from an electrical power substation to a distributed generation site in an electrical power grid, the guard signal allowing protection of the distributed generation site by a detection of an islanding condition, said method comprising:

injecting the guard signal onto medium voltage distribution lines at the substation, said guard signal causing a receiver at the distributed generation site to control a recloser at an interconnection point of the distributed generation site, the medium voltage distribution lines connected between the distributed generation site and the substation.

According to an embodiment of the present invention, the guard signal is a repetitive signal and the receiver is configured to maintain the recloser in a closed state as long as the repetitive signal is received at the receiver.

According to an embodiment of the present invention, the guard signal uses a Power Line Carrier (PLC) signaling in a frequency range of 50 KHz to 550 KHz.

According to one embodiment of the present invention, the guard signal is injected onto the medium voltage distribution lines using a single phase-to-ground coupling to said medium voltage distribution lines.

According to another embodiment of the present invention, the medium voltage distribution lines are multi-phase distribution lines and the guard signal is injected onto the medium voltage distribution lines using phase-to-phase differential coupling to the multi-phase distribution lines.

According to an embodiment of the present invention, the guard signal includes a signature to identify the substation where the guard signal is injected onto the medium voltage distribution lines, said signature chosen for unique identification of a circuit path from the substation to the distributed generation site.

According to an embodiment of the present invention, the guard signal is injected via a capacitive coupling to the medium voltage distribution lines.

According to an embodiment of the present invention, the guard signal is generated by a transmitter associated with the substation, and wherein dry contact relays directly connect the transmitter to utility equipment at the substation.

According to an embodiment of the present invention, dry contact relays directly connect the receiver to utility equipment at the distributed generation site.

According to an embodiment of the present invention, a loss of the repetitive signal at the receiver indicates an islanding condition, the loss of the repetitive signal at the receiver causing the recloser at the distributed generation site to operate in an open state within a predetermined time period.

According to an embodiment of the present invention, the predetermined time period is approximately two seconds.

According to an embodiment of the present invention, the loss of the repetitive signal at the receiver is caused by a command sent from the substation to a transmitter to stop sending the guard signal to the distributed generation site.

According to an embodiment of the present invention, the repetitive signal at the receiver is restored when the islanding condition is removed, and wherein restoration of the repetitive signal at the receiver causes the recloser at the distributed generated site to change from the open state to the closed state.

According to an embodiment of the present invention, the restoration of the repetitive signal at the receiver is caused by a command sent from the substation to the distributed generation site.

According to an embodiment of the present invention, the guard signal is injected onto the medium voltage distribution lines in a point-to-point network, the point-to-point network comprising the receiver at the distributed generation site and a transmitter at the substation, the transmitter configured to generate the guard signal.

According to an embodiment of the present invention, one or more regeneration devices are positioned between the transmitter at the substation and the receiver at the distributed generation site, the regeneration devices configured to repeat the guard signal.

The second aspect of the present invention is a system for sending a permissive guard signal from an electrical power substation to a distributed generation site in an electrical power grid, the guard signal allowing the distributed generation site to detect an islanding condition and protection of the distributed generation site, the system comprising:

a coupling device electrically coupled to medium voltage distribution lines connecting between the distributed site and the substation, the coupling device configured to inject the guard signal onto the medium voltage distribution lines at the substation, said guard signal causing a receiver at the distributed generation site to control a recloser at the distributed generation site.

According to an embodiment of the present invention, the guard signal is a repetitive signal and the receiver is configured to maintain the recloser in a closed state as long as the repetitive signal is received at the receiver.

According to an embodiment of the present invention, the system further comprises a modem configured to inject the guard signal in a frequency range of 50 KHz to 550 KHz onto the medium voltage distribution lines via the coupling device.

According to one embodiment of the present invention, the coupling device is configured to inject the guard signal onto the medium voltage distribution lines using a single phase-to-ground coupling of said medium voltage distribution lines.

According to another embodiment of the present invention, the medium voltage distribution lines are multi-phase distribution lines and wherein the coupling device is configured to inject the guard signal onto the medium voltage distribution lines using phase-to-phase differential coupling of the multi-phase distribution lines.

According to an embodiment of the present invention, a loss of the repetitive signal at the receiver indicates an islanding condition, wherein the receiver is configured upon detection of loss of the repetitive signal at the receiver to cause the recloser at the distributed generation site to operate in an open state within a predetermined time period, and the predetermined time period is approximately two seconds.

According to an embodiment of the present invention, upon restoration of the repetitive signal at the receiver the receiver is configured to cause the recloser at the distributed generated site to change from the open state to the closed state.

DETAILED DESCRIPTION OF THE INVENTION

Medium Voltage (MV) is defined as line voltages in the range of 4 kV to 36 kV typically used by electric utilities over their distribution circuits. The MV lines are installed between a distributed generation (DG) site and an electrical power substation. The typical distance between a substation and a DG site is less than 10 miles; however there are some special cases where the distance is as long as 40 miles. The Power Line Carrier (PLC) signaling system of the present invention includes a Transmitter device (TX) at the substation and a Receiver device (RX) at the DG site. If the distance between the substation and the DG site is sufficiently long, one or more Regenerator devices (RG) are also deployed along the path in order to extend signal transmission. The operating frequency of the PLC signal is between 50 KHz and 550 KHz. The PLC signaling system, according to embodiments of the present invention, uses capacitive coupling to the MV wire to inject and extract high frequency signals to and from the MV line or lines. Differential coupling over two phases may be used for better performance and higher reliability. Each substation may use a unique signature to identify itself. As such, each RX unit is capable of identifying multiple signatures from various substations. The PLC signaling system can be configured to filter out noise and to distinguish between a legitimate signal signature and line noise. The PLC signaling system, according to the present invention, operates on existing overhead and underground lines with or without circuit modifications. The PLC signal, according to the present invention, does not jump a recloser gap when an intermediate recloser opens. The installation of the PLC signaling system can be done on energized lines by a trained utility crew, for example.

Figure 1A:
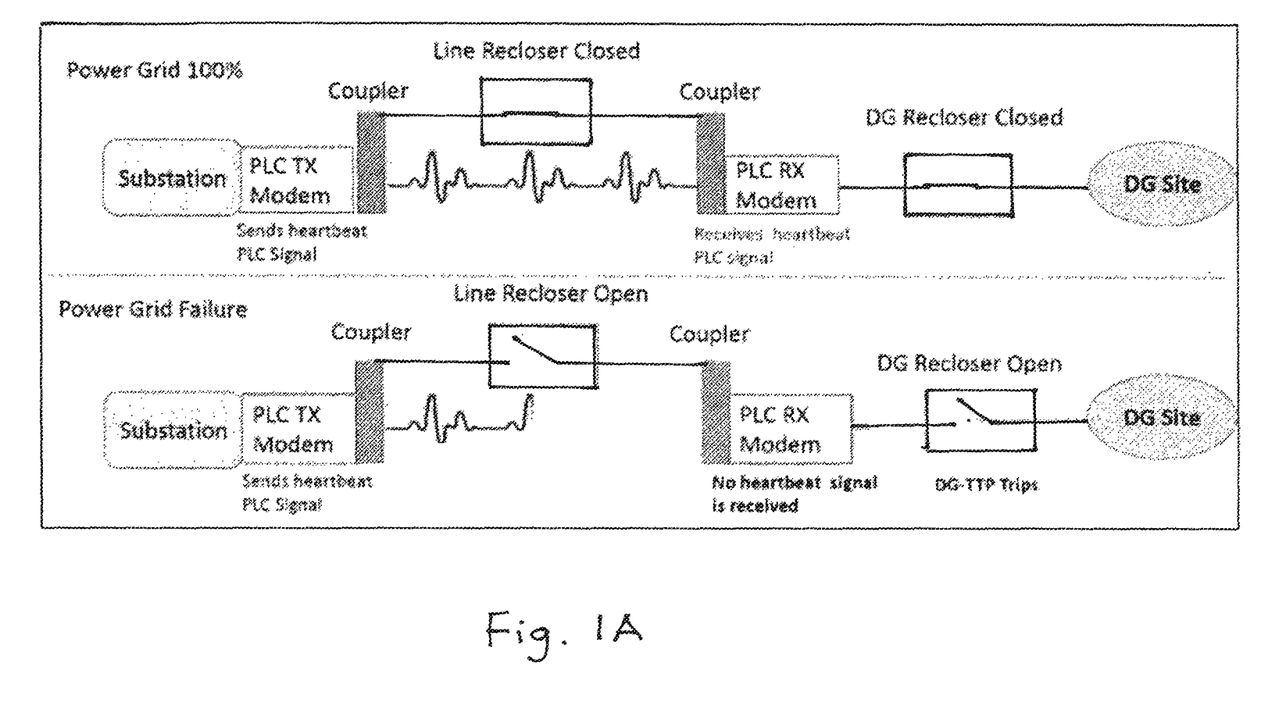
FIG. 1A is a schematic diagram of the present invention, showing the signaling between an electrical power substation and a distributed generation (DG) site.

FIG. 1A is a diagram that shows the signaling between an electrical power substation and a DG site, according to an embodiment of the present invention. As shown in FIG. 1A, a PLC TX modem at a substation generates a permissive guard signal and sends the permissive guard signal, via a coupling device, to a DG site over MV voltage lines If the line recloser is closed, the PLC RX modem at the DG site receives the permissive guard signal from the MV voltage lines through a coupling device. The permissive guard signal is a repetitive signal that causes the PLC RX modem at the DG site to maintain the recloser at the DG site in a closed state as long as the permissive guard signal is received by the PLC RX at the DG site. If the line recloser is open, the PLC RX modem at the DG site will not receive the permissive guard signal, indicating that an islanding condition has occurred. The loss of the permissive guard signal or the lack of permissive guard signal detection at the PLC RX modem causes the recloser at the DG site to operate in an open state. In effect, the lack of the signal detection at the PLC RX modem serves as a Transfer Trip (TT) command that causes the recloser at the DG site to trip and disconnects the DG facility from the line. Equivalently, the recloser at the DG site is caused to trip by a Transfer Trip (TT) command sent from the substation to the PLC TX modem. This TT command causes the loss of the signal at the PLC RX modem at the DG site. The loss of the heartbeat signal at the PLC RX modem indicates the occurrence of an islanding condition. Upon the detection of an islanding condition, the PLC RX modem is configured to open the recloser at the DG site within two seconds and the DG site is taken offline. Once the islanding condition is removed and the line recloser is closed, the permissive guard signal is restored at the PLC RX modem. The restoration of the permissive guard signal at the PLC RX modem causes the recloser at the DG site to operate in the closed state. In effect, the restoration of the permissive guard signal at the PLC RX modem serves as a CLOSE command to close the recloser at the DG site.

Figure 1B:
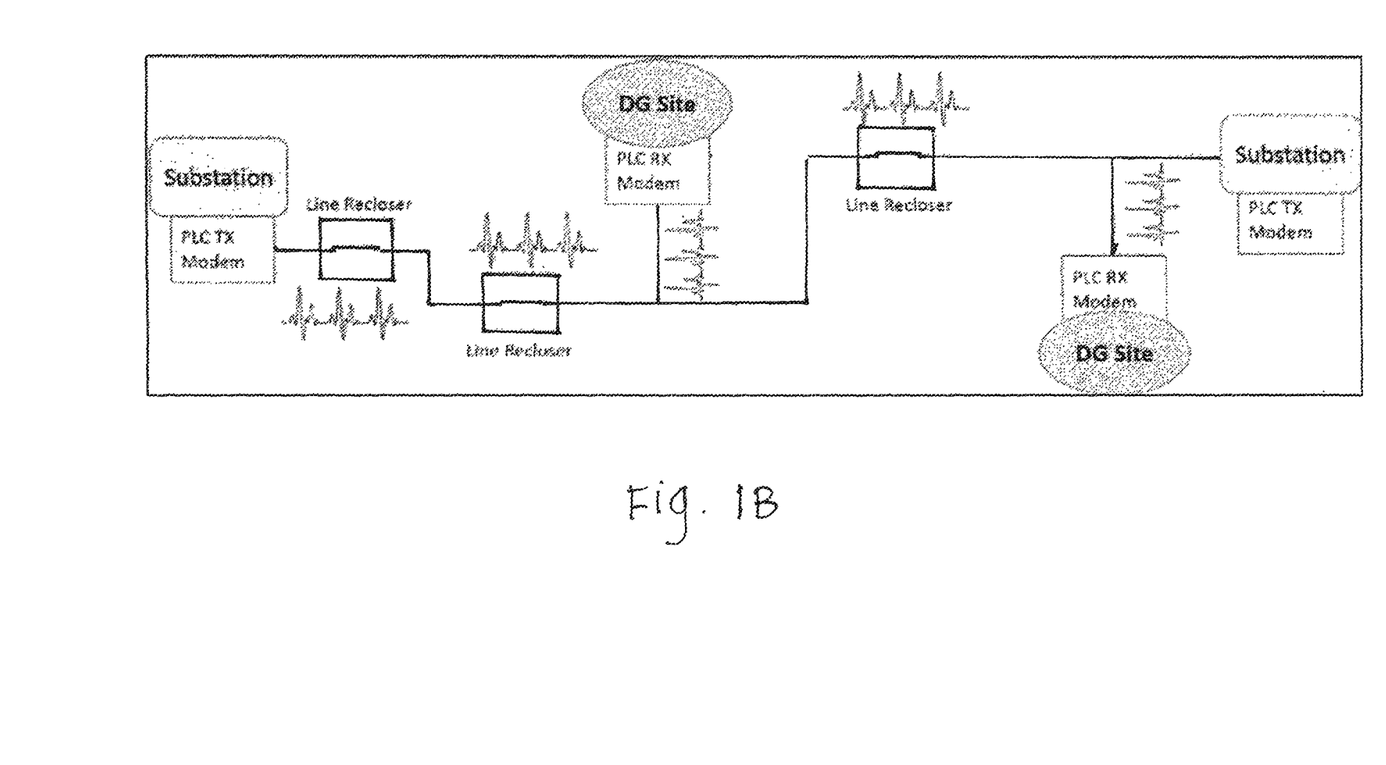
FIG. 1B is a diagram that shows the signaling between a number of DG sites and a substation.

FIG. 1B is a diagram that shows an example where more than one DG site is connected to a distribution grid. When there is no islanding condition, the line reclosers are in the closed state. The permissive guard signal always travels from a substation to a DG site and is independent of the number of line reclosers along the path as well as the number of DG sites connected to the substation. Anti-islanding detection now becomes the detection of signal continuity from the substation to the DG location with the power lines being used as a signal carrier. As such, one permissive guard signal generator is sufficient to cover multiple DG sites served by a substation on the same feeder circuit. When multiple substations are connected to a DG site, each substation uses a different signature in the permissive guard signal to uniquely identify itself and the path to the DG site. As such, the receiver at a DG site is able to identify where the islanding condition occurred based on the lack of that specific signature The local PLC TX unit connects to the utility's alarm system inside the substation using dry relay contacts (see FIG. 6, for example). The PLC TX unit receives a TT command from the substation when its relay contact is closed. The TT indication is implemented by stopping the transmission of the permissive guard signal. The utility can also use this mechanism for testing purposes.

When a PLC RX unit detects the loss of the permissive guard signal, it activates a dry relay contact that is directly connected to the controller (not shown) of the DG recloser. The controller senses the activation of the relay and trips the recloser. When the permissive guard signal is resumed, the relay contact is released and the controller closes the recloser. The same operation is activated when there is a loss of the guard signal due to a physical break in the line due to an opening of a midline switch.

Figure 2:
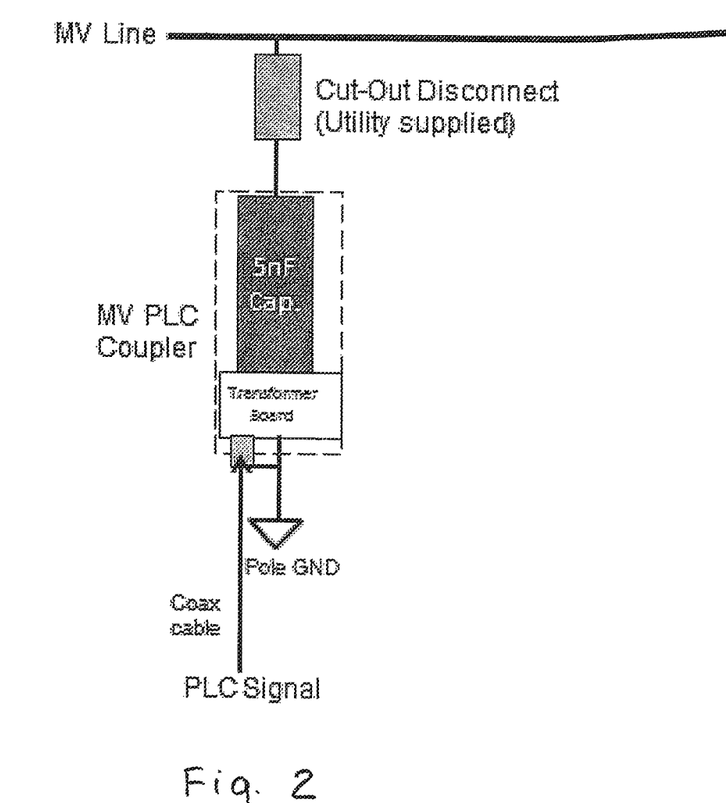
FIG. 2 is a block diagram of the PLC coupling device that connects to the medium voltage (MV) distribution line.

FIG. 2 is a block diagram of the PLC capacitive coupler that is used to connect to the MV line. The PLC signal is delivered from the PLC modem to the PLC capacitive coupler mounted at the top of the pole through a low loss coaxial cable. The PLC signal enters the coupler via an RF connector and is coupled to the MV line through a 5 nF capacitor, for example. A transformer board provides isolation between the primary circuit that connects to the MV line and the secondary circuit that connects to the PLC modem( ). For safety reasons, a cut-out switch between the coupler and the MV line is used to physically disconnect the PLC signaling system from the energized line.

Figure 3:
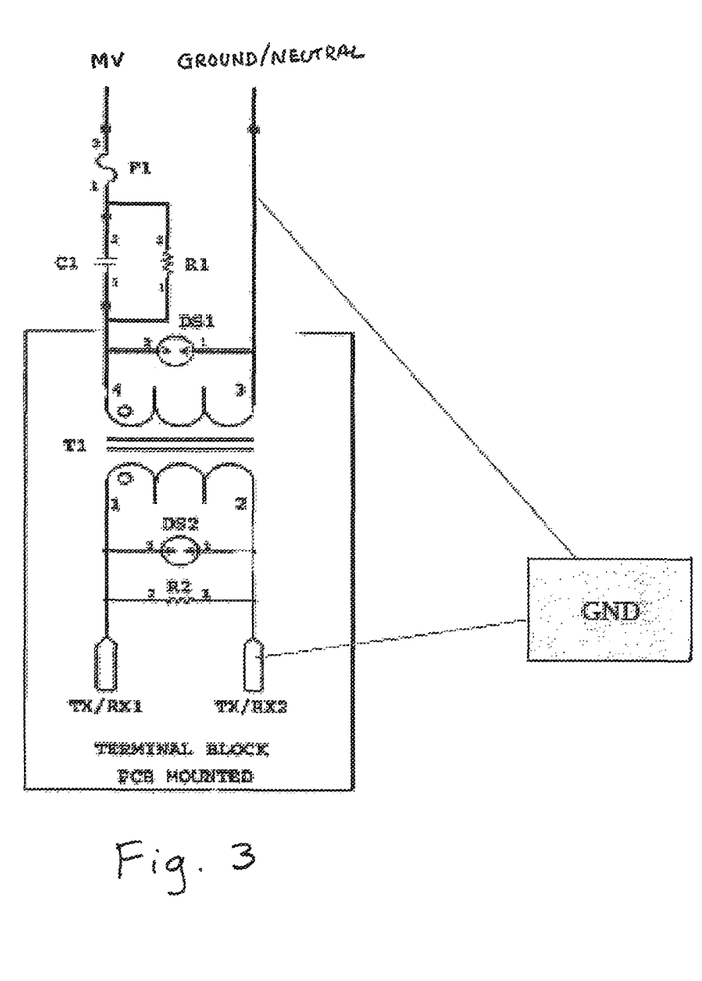
FIG. 3 is a diagram that shows a grounding scheme of the PLC capacitive coupler.

FIG. 3 is a diagram that shows an exemplary grounding scheme of the PLC capacitive coupler. The primary ground shield and the secondary coax shield are both connected to the pole ground at earth ground potential. The grounding is used to eliminate floating voltages that may be present at the PLC modem if proper grounding is not done.

Figure 4:
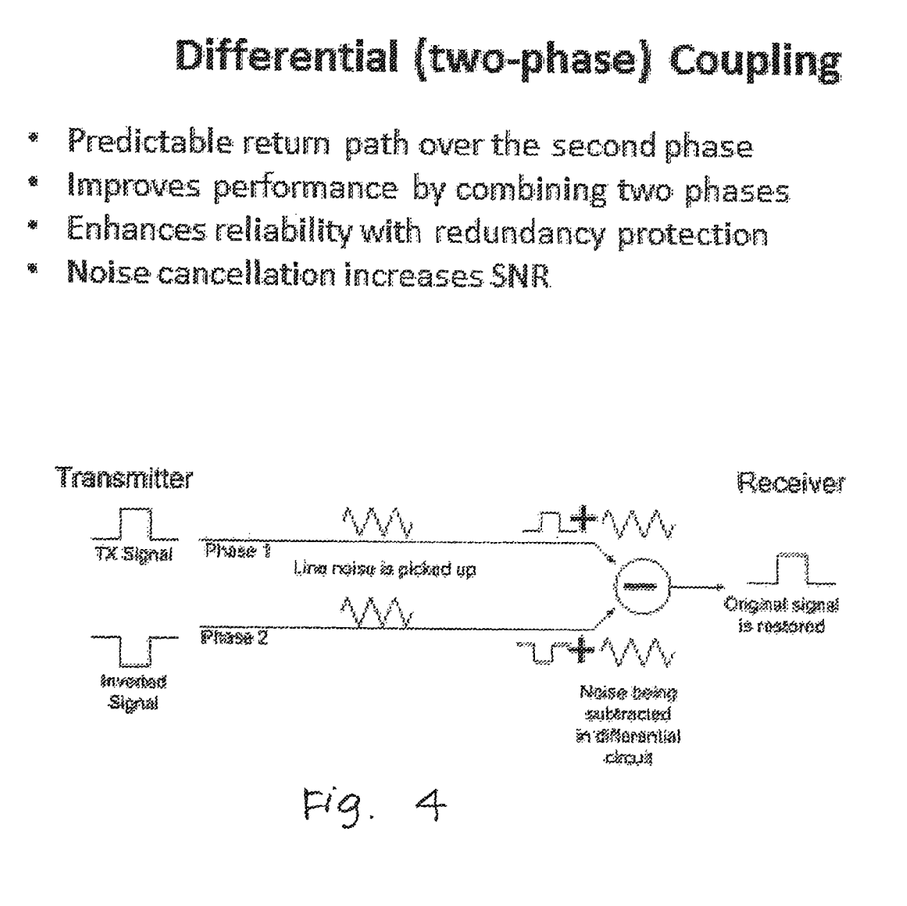
FIG. 4 is a diagram that illustrates the method of using two-phase differential coupling and the advantages of such coupling.

FIG. 4 illustrates the method of using two-phase differential coupling and its advantages. Although the PLC signaling can be implemented with a single phase using phase-to-ground coupling, there are significant advantages to a 2-phase differential coupling approach. With phase-to-phase coupling the return path of the PLC signal is more predictable than phase-to-ground coupling. The differential launch eliminates some of the line noise and increases SNR. The use of two phases also provides redundancy in case of a single phase disconnection.

Figure 5:
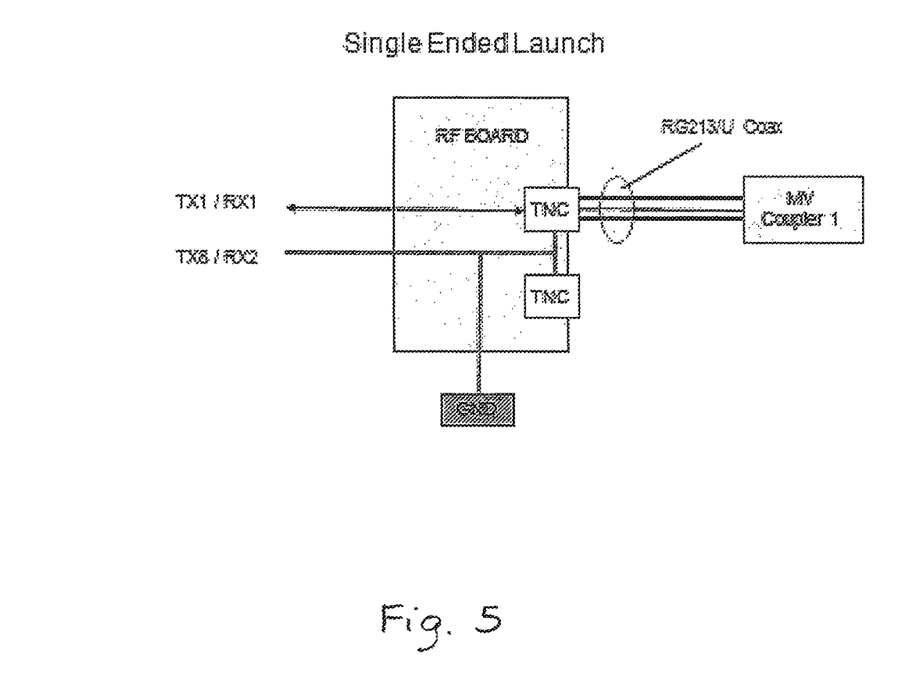
FIG. 5 is a diagram that illustrates the coax connection of the RF interface to a single coupler.

FIG. 5 shows the coax connection of the RF interface to a single coupler. These single phase coupling connections can be used for a single-ended launch.

Figure 6:
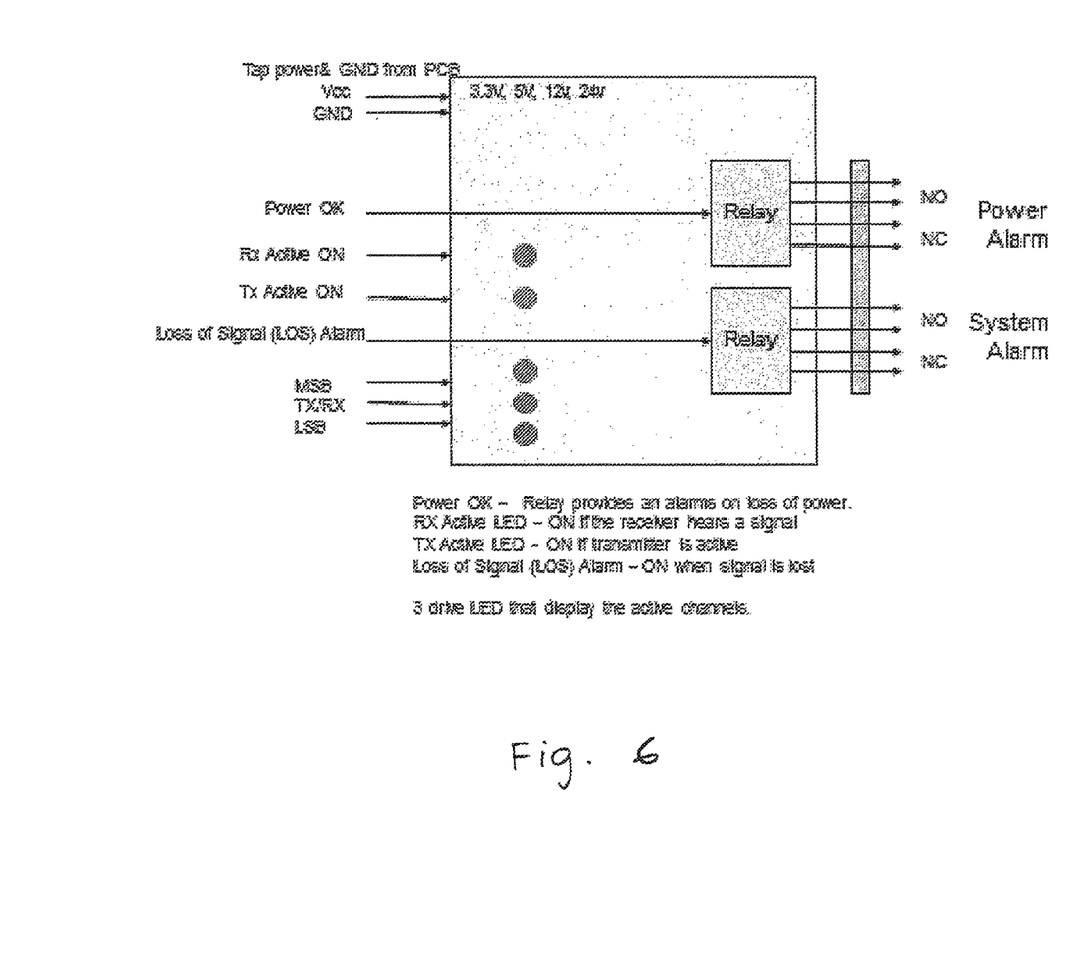
FIG. 6 is a diagram that shows a control board that houses the dry contact relays used for interfacing with the utility's equipment.

FIG. 6 is a block diagram of the control board that houses the dry contact relays used for interfacing with the utility's equipment. The TX unit receives a relay contact from the controller inside the substation and the RX unit drives a relay contact to the controller of the DG site recloser. It should be noted that regeneration units do not require a control interface board since they do not interface with utility equipment. The normally open (NO) and the normally closed (NC) relay outputs are shown.

Figure 7:
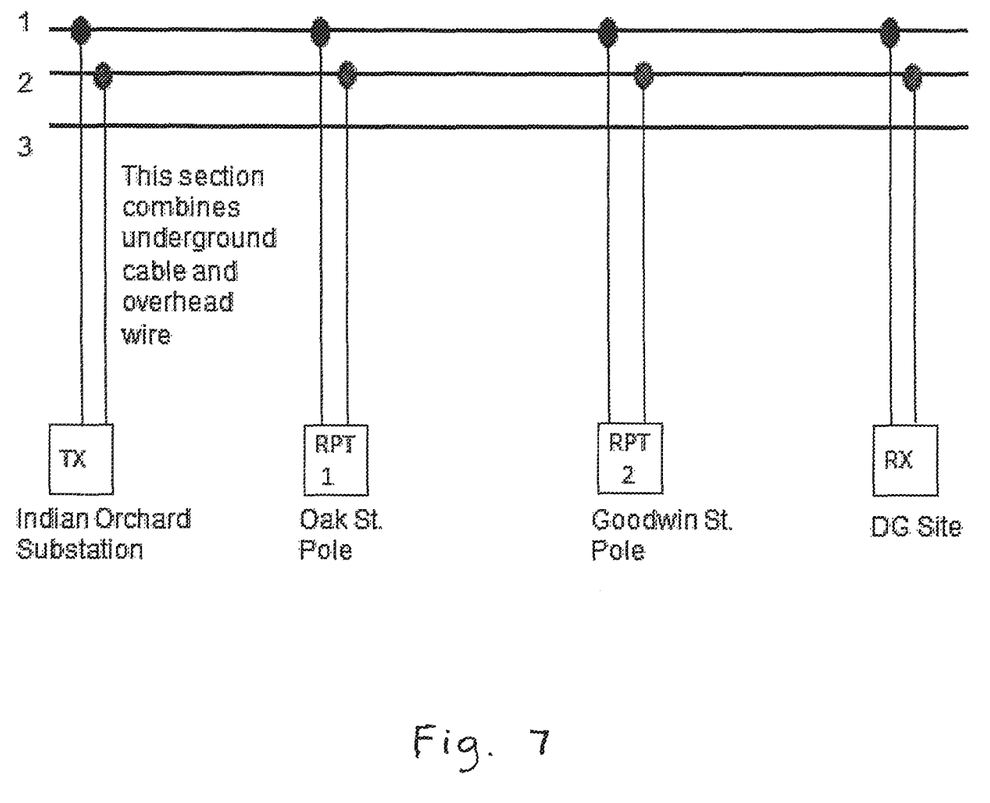
FIG. 7 is a diagram that shows a network design of a 1.5 mile connection between a substation and a DG site.

FIG. 7 is a diagram that shows an exemplary network design of a 1.5 mile connection between a substation and a DG site. The TX unit is located inside the substation and the RX unit is mounted on a pole next to the DG recloser. Two regenerator units are deployed on intermediate poles about 0.5 miles apart from each other to extend the reach of the signal. This network design has been used in a field installation for testing purposes.

Figure 8:
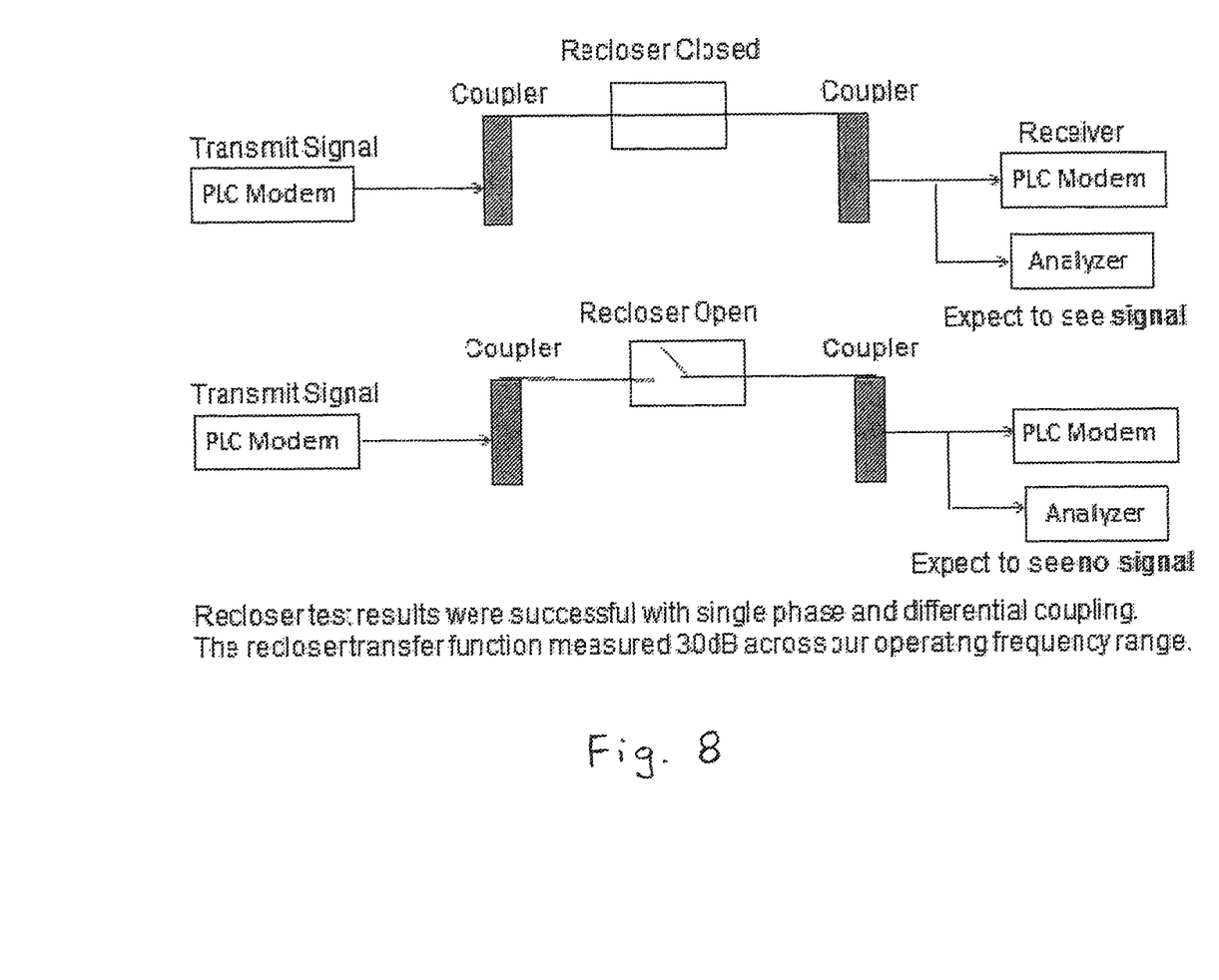
FIG. 8 is a diagram that illustrates a test setup to test the concept of sending a permissive guard signal through a recloser.

FIG. 8 is a diagram that illustrates a setup to test the concept of sending a permissive guard signal through a midline recloser. The midline recloser has two operational states: open and closed. It is expected that when the recloser is in its closed state, the PLC modem on the Receiver side will receive the PLC signal. When the recloser is in its open (tripped) state, the PLC modem on the Receiver side will not receive the PLC signal. The recloser transfer function has been measured across the PLC frequency range. There is a 30 dB difference between the open and closed states.

It should be noted that a DG site uses a number of photovoltaic inverters. These inverters may contribute to the rise of the noise floor by about 20 dB within the operating range of the PLC transmission. The rise of the noise floor can be mitigated by using EMI filters that shut to ground the harmonic frequencies produced by the inverters.

In summary, the present invention provides a method, network and system for anti-islanding protection in an electrical power grid using Power Line Carrier (PLC) signaling. In an embodiment of the present invention, a permissive guard signal is sent from an electrical power substation to a distributed generation (DG) site over existing medium voltage distribution lines so as to allow the DG site to detect an islanding condition. In an embodiment of the present invention, the permissive guard signal is sent in accordance with Power Line Carrier (PLC) signaling in the frequency range of 50 KHz to 550 KHz. The permissive guard signal is injected onto the medium voltage distribution lines via a coupling device, using single phase to ground coupling or phase-to-phase differential coupling. For example, a capacitive coupler is used to inject the high frequency PLC signal onto the medium voltage lines. According to an embodiment of the present invention, each substation uses a different signature in the guard signal so as to uniquely identify the electrical circuit path from a substation to the DG site.

According to an embodiment of the present invention, dry contact relays are used to directly attach the transmitter to utility equipment inside the substation and send a Transfer Trip (TRIP) command from the substation to the DG site. At the DG site, dry contact relays are used to directly attach the receiver to utility equipment at the DG site.

According to an embodiment of the present invention, a point-to-point network with a transmitter inside the substation and a receiver at the DG site is used. One or more regenerator units are used between the transmitter and the receiver in order to extend the distance of the PLC signal.

According to an embodiment of the present invention, upon identifying an islanding condition, a TRIP command is sent from a substation to a DG site to cause a loss of the permissive guard signal at the receiver at the DG site. Furthermore, when a loss of the permissive guard signal occurs at the receiver located near the DG site recloser, the DG site recloser is caused to operate in the open state. Once the islanding condition is removed, a CLOSE command is sent from the substation to the DG site, and causing the restoration of the permissive guard signal at the receiver located near the DG site. Subsequently, the DG site recloser is caused to resume its closed state.

According to an embodiment of the present invention, the permissive guard signal is a repetitive signal and an islanding condition is identified as a loss of the permissive guard signal at the DG site receiver. The loss of the permissive guard signal can be caused by the opening of a line recloser near the DG site or an intermediate recloser along the path between the substation and the DG site.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method of sending a permissive guard signal from an electrical power substation to a distributed generation site in an electrical power grid, the guard signal allowing protection of the distributed generation site by a detection of an islanding condition, said method comprising:
    injecting the guard signal onto medium voltage distribution lines at the substation, said guard signal causing a receiver at the distributed generation site to control a recloser at an interconnection point of the distributed generation site, the medium voltage distribution lines connected between the distributed generation site and the substation.

2. The method according to claim 1, wherein the guard signal is a repetitive signal and the receiver is configured to maintain the recloser in a closed state as long as the repetitive signal is received at the receiver.

3. The method according to claim 1, wherein the guard signal uses a Power Line Carrier (PLC) signaling in a frequency range of 50 kHz to 550 KHz.

4. The method according to claim 3, wherein the guard signal is injected onto the medium voltage distribution lines using a single phase-to-ground coupling to said medium voltage distribution lines.

5. The method according to claim 3, wherein the medium voltage distribution lines are multi-phase distribution lines and the guard signal is injected onto the medium voltage distribution lines using phase-to-phase differential coupling to the multi-phase distribution lines.

6. The method according to claim 1, herein the guard signal includes a signature to identify the substation where the guard signal is injected onto the medium voltage distribution lines, said signature chosen for unique identification of a circuit path from the substation to the distributed generation site.

7. The method according to claim 3, wherein the guard signal is injected via a capacitive coupling to the medium voltage distribution lines.

8. The method according to claim 1, wherein the guard signal is generated by a transmitter associated with the substation, and wherein dry contact relays directly connect the transmitter to utility equipment at the substation.

9. The method according to claim 1, wherein dry contact relays directly connect the receiver to utility equipment at the distributed generation site.

10. The method, according to claim 2, wherein a loss of the repetitive signal at the receiver indicates an islanding condition, the loss of the repetitive signal at the receiver causing the recloser at the distributed generation site to operate in an open state within a predetermined time period.

11. The method according to claim 10, herein the predetermined time period is approximately two seconds.

12. The method according to claim 10, wherein the loss of the repetitive signal at the receiver is caused by a command sent from the substation to a transmitter to stop sending the guard signal to the distributed generation site.

13. The method according to claim 10, wherein the repetitive signal at the receiver is restored when the islanding condition is removed.

14. The method according to claim 13, wherein the restoration of the repetitive signal at the receiver is caused by a command sent from the substation to the distributed generation site.

15. The method according to claim 1, wherein the guard signal is injected onto the medium voltage distribution lines in a point-to-point network, the point-to-point network comprising the receiver at the distributed generation site and a transmitter at the substation, the transmitter configured to generate the guard signal.

16. The method according to claim 14, wherein one or more regeneration devices are positioned between the transmitter at the substation and the receiver at the distributed generation site, the regeneration devices configured to repeat the guard signal.

17. A system for sending a permissive guard signal from an electrical power substation to a distributed generation site in an electrical power grid, the guard signal allowing the distributed generation site to detect an islanding condition and protection of the distributed generation site, comprising:
    a coupling device electrically coupled to medium voltage distribution lines connecting between the distributed generation site and the substation, the coupling device configured to inject the guard signal onto the medium voltage distribution lines at the substation, said guard signal causing a receiver at the distributed generation site, to control a recloser at the distributed generation site.

18. The system according to claim 17, wherein the guard signal s a repetitive signal and the receiver is configured to maintain the recloser in a closed state as long as the repetitive signal is received at the receiver.

19. The system according to claim 17, further comprising a modem configured to inject the guard signal in a frequency range of 50 kHz to 550 KHz onto the medium voltage distribution lines via the coupling device.

20. The system according to claim 19, wherein the coupling device is configured to inject the guard signal onto the medium voltage distribution lines using a single phase-to-ground coupling of said medium voltage distribution lines.

21. The system according to claim 19, wherein the medium voltage distribution lines are multi-phase distribution lines and wherein the coupling device is configured to inject the guard signal onto the medium voltage distribution lines using phase-to-phase differential coupling of the multi-phase distribution lines.

22. The system according to claim 18, wherein a loss of the repetitive signal at the receiver indicates an islanding condition, wherein the receiver is configured upon detection of loss of the repetitive signal at the receiver to cause the recloser at the distributed generation site to operate in an open state within a predetermined time period.

23. The system according to claim 22, wherein the predetermined time period is approximately two seconds.

* * * * *